United States Patent
Fara et al.

(10) Patent No.: US 11,777,572 B2
(45) Date of Patent: Oct. 3, 2023

(54) METHOD FOR GENERATING AT LEAST ONE BACKSCATTERING ZONE OF AN AMBIENT SIGNAL AND/OR FOR RECEIVING A BACKSCATTERED AMBIENT SIGNAL

(71) Applicant: ORANGE, Issy-les-Moulineaux (FR)

(72) Inventors: Romain Fara, Chatillon (FR); Dinh Thuy Phan Huy, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 109 days.

(21) Appl. No.: 17/632,372

(22) PCT Filed: Jul. 29, 2020

(86) PCT No.: PCT/FR2020/051399
§ 371 (c)(1),
(2) Date: Feb. 2, 2022

(87) PCT Pub. No.: WO2021/023928
PCT Pub. Date: Feb. 11, 2021

(65) Prior Publication Data
US 2022/0286171 A1 Sep. 8, 2022

(30) Foreign Application Priority Data
Aug. 2, 2019 (FR) ...................................... 1908917

(51) Int. Cl.
*H04B 7/06* (2006.01)
*H04B 5/00* (2006.01)
(Continued)

(52) U.S. Cl.
CPC ......... *H04B 7/0617* (2013.01); *H04B 5/0031* (2013.01); *H04B 7/086* (2013.01); *H04W 52/38* (2013.01)

(58) Field of Classification Search
CPC .... H04B 7/0617; H04B 5/0031; H04B 7/086; H04B 7/15; H04W 52/38; H04W 52/46; H04W 52/42
(Continued)

(56) References Cited

U.S. PATENT DOCUMENTS

2012/0029490 A1\* 2/2012 Lin ..................... A61F 9/00821
606/4

OTHER PUBLICATIONS

English translation of the Written Opinion of the International Searching Authority dated Nov. 3, 2020 for corresponding International Application No. PCT/FR2020/051399, filed Jul. 29, 2020.

(Continued)

*Primary Examiner* — Fitwi Y Hailegiorgis
(74) *Attorney, Agent, or Firm* — David D. Brush; Westman, Champlin & Koehler, P.A.

(57) ABSTRACT

A process for generating at least one backscattering zone, by at least one transmitter device and to at least one receiver device, of an ambient radio signal emitted by at least one source; and a process for generating at least one reception zone, by the receiver device, of the backscattered ambient signal. The process for includes: determining an emission constraint, when it is respected by the source, for generating at least one backscattering zone in which the received electromagnetic power is greater than a determined threshold, called "backscattering threshold", and/or generating at least one reception zone in which the received electromagnetic power is less than a determined threshold, called "reception threshold"; and transmitting, by the source, with respect to the emission constraint.

15 Claims, 7 Drawing Sheets

(51) Int. Cl.
   H04B 7/08   (2006.01)
   H04W 52/38  (2009.01)
(58) Field of Classification Search
   USPC ........................................................ 375/295
   See application file for complete search history.

(56) References Cited

OTHER PUBLICATIONS

Wu Q. et al., "Towards Smart and Reconfigurable Environment: Intelligent Reflecting Surface Aided Wireless Network", arxiv.org, Cornell University Library, 201 Olin Library Cornell University Ithaca, NY 14853, Aug. 30, 2019 (Aug. 30, 2019), XP081488826.
N. Van Huynh et al., "Ambient Backscatter Communications: A Contemporary Survey", in IEEE Communications Surveys & Tutorials, vol. 20, No. 4, pp. 2889-2922, arXiv:1712.04804v1 [cs.NI], Dec. 13, 2017.
"DFT beamforming for more accurate estimate of signal DOA with application to improving DS / CDMA receiver performance", T. B. Vu, Electronic Letters, vol. 36, No. 9, pp. 834-836, Apr. 27, 2000.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.211 V15.5.0 (Mar. 2019).
Chiba I. et al., "Null forming method by phase control of selected array elements using plane-wave synthesis", Antennas and Propagation Society Symposium, AP02-07, pp. 70-73, 1987.
International Search Report dated Oct. 26, 2020 for corresponding International Application No. PCT/FR2020/051399, dated Jul. 29, 2020.
Written Opinion of the International Searching Authority dated Oct. 26, 2020 for corresponding International Application No. PCT/FR2020/051399, filed Jul. 29, 2020.
French Search Report dated Apr. 14, 2020 for corresponding French Application No. 1908917, filed Aug. 2, 2019.
Sydanheimo L et al, "Characterization of Passive UHF RFID Tag Performance", IEEE Antennas and Propagation Magazine, IEEE Service Center, Piscataway, NJ, US, vol. 50, No. 3, Jun. 1, 2008 (Jun. 1, 2008), pp. 207-212, XP011266598.

* cited by examiner

[Fig. 1]
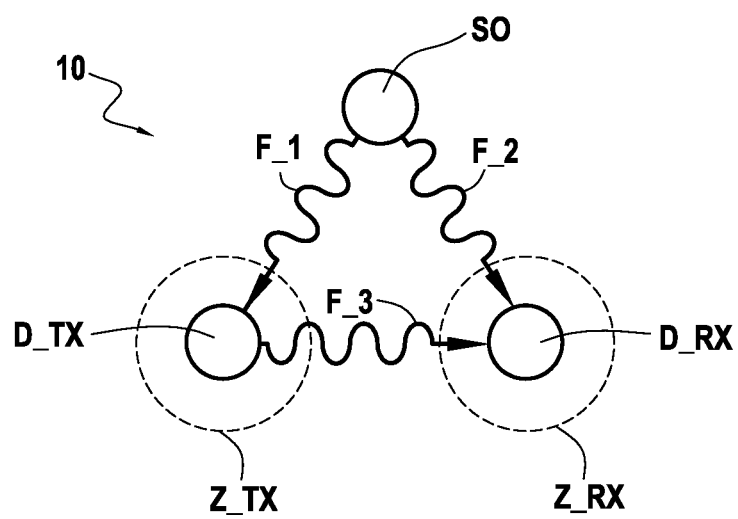
[Fig. 2]
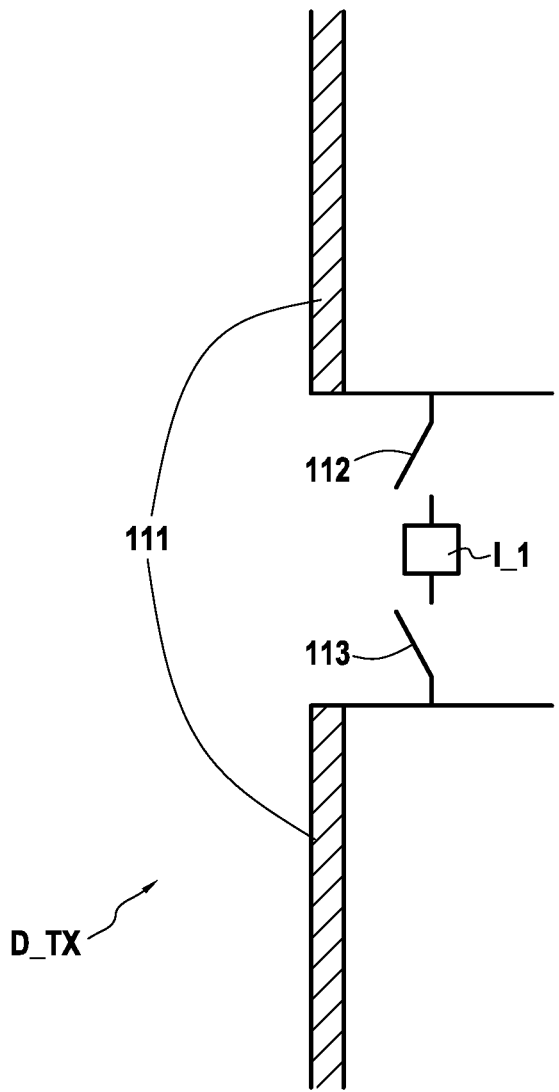

[Fig. 3]
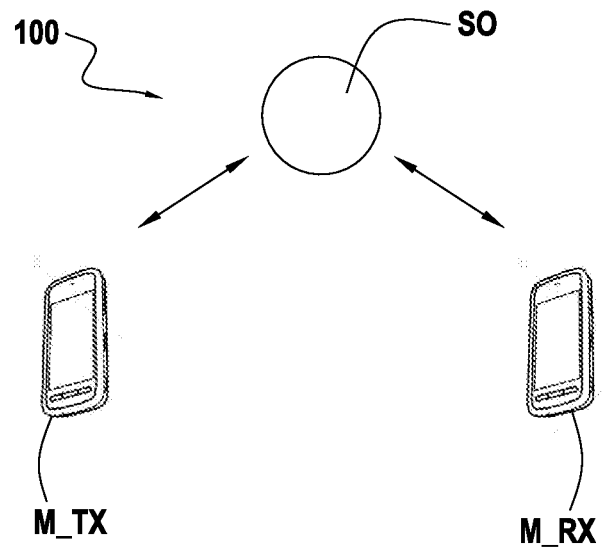
[Fig. 4]
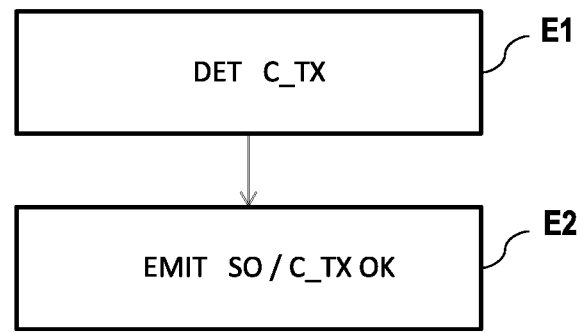

[Fig. 5]
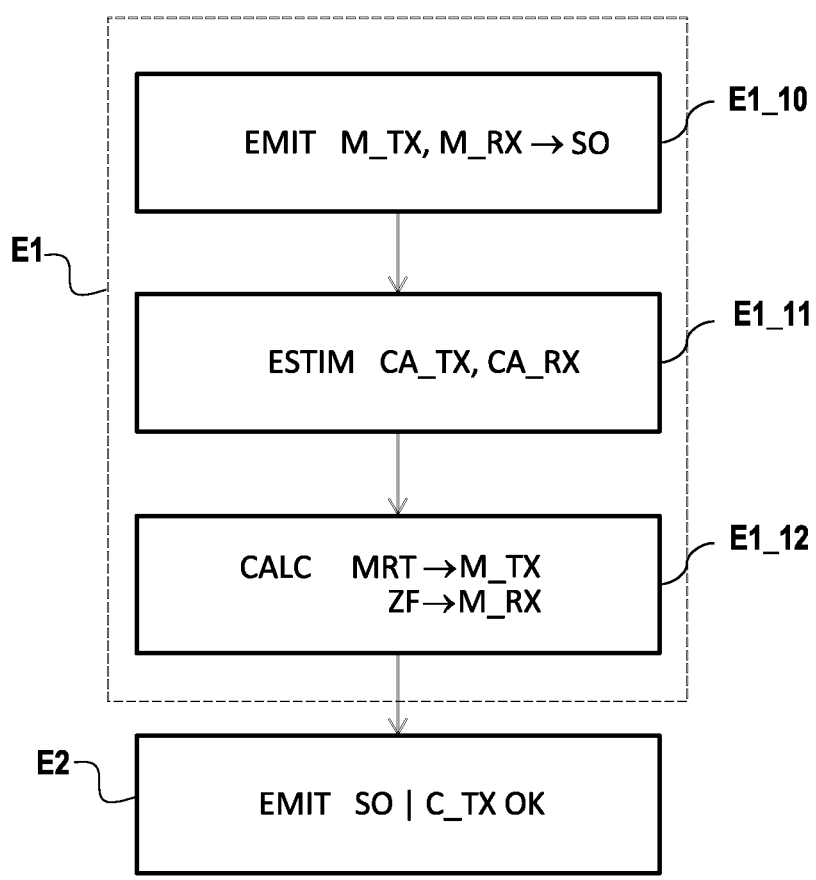

[Fig. 6]
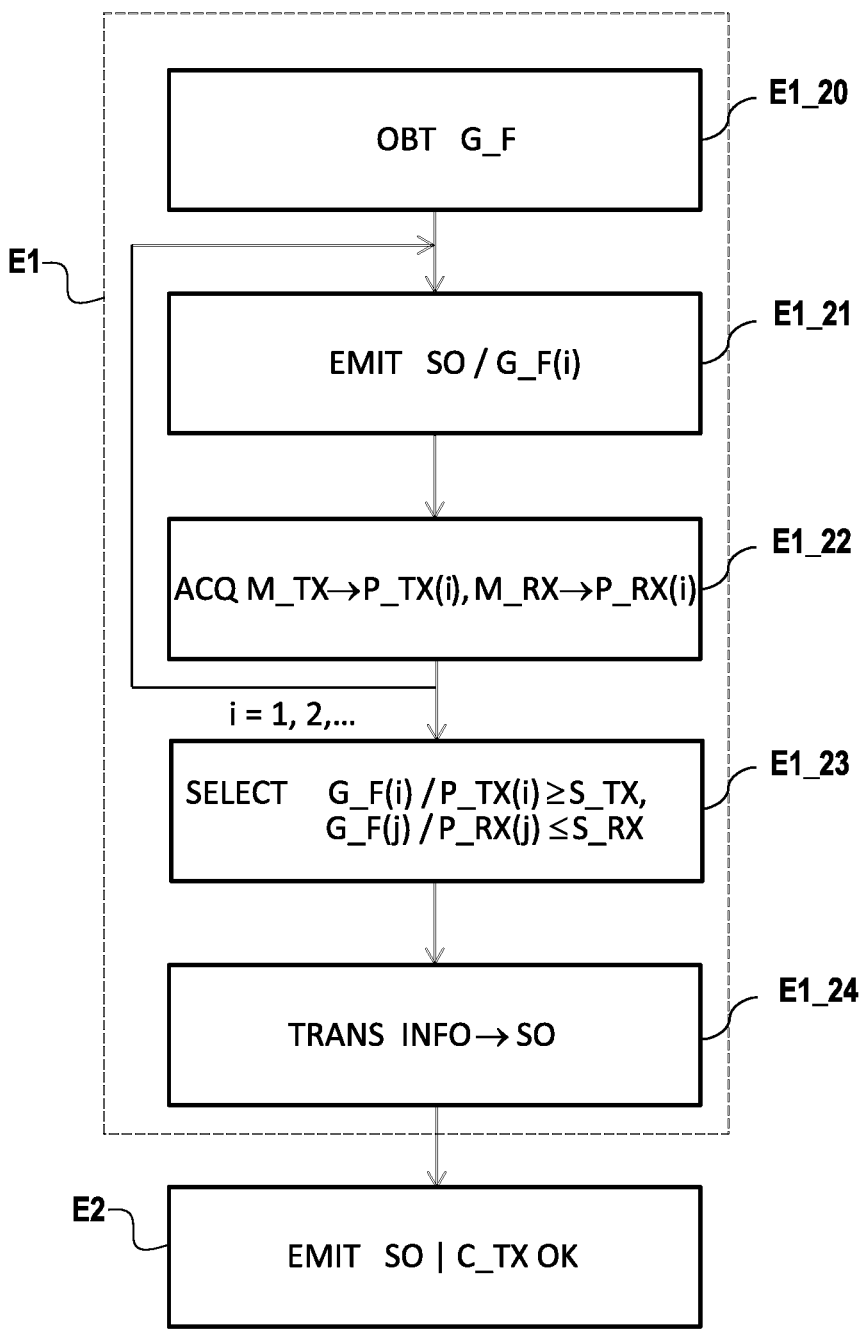

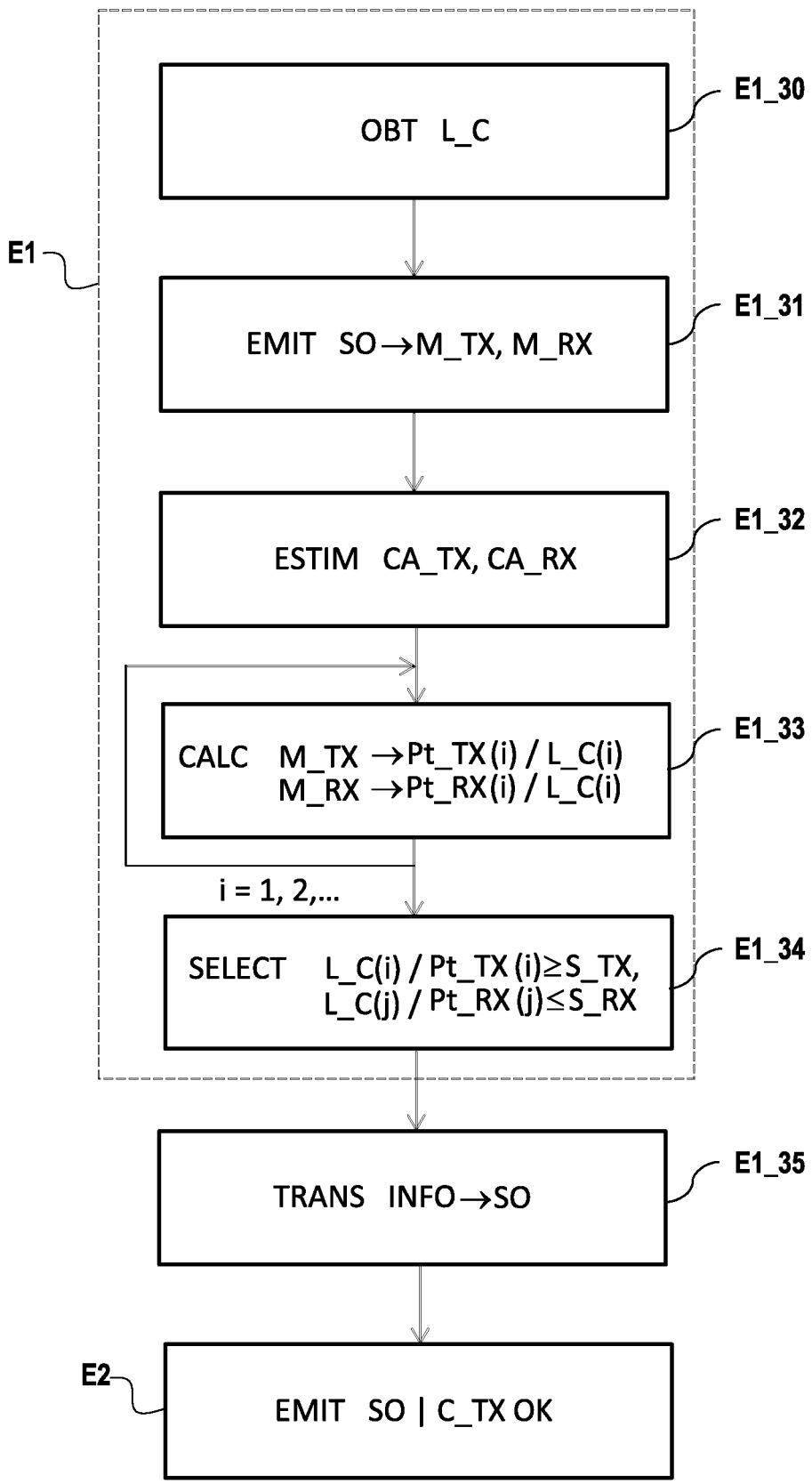
[Fig. 7]

[Fig. 8]
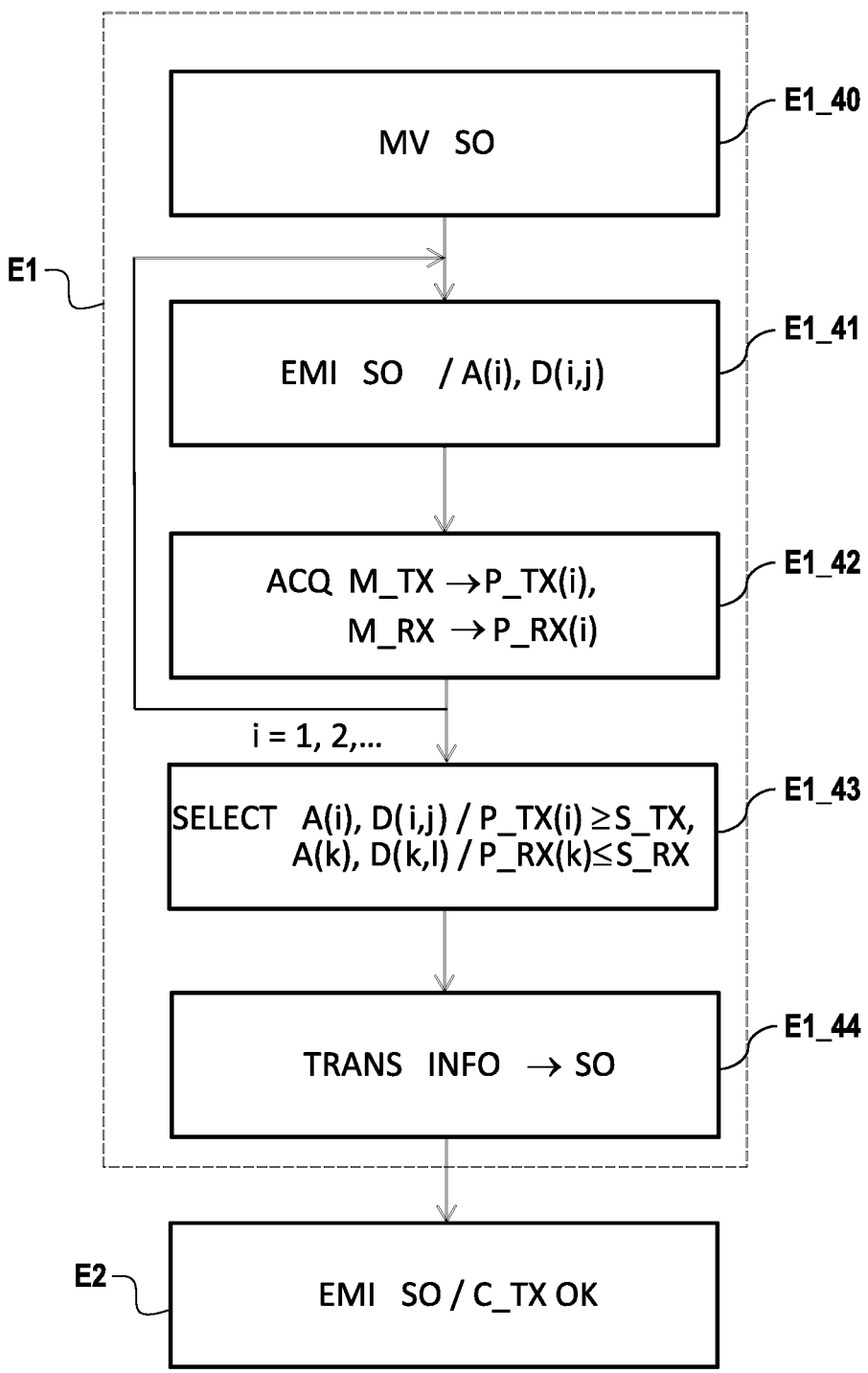

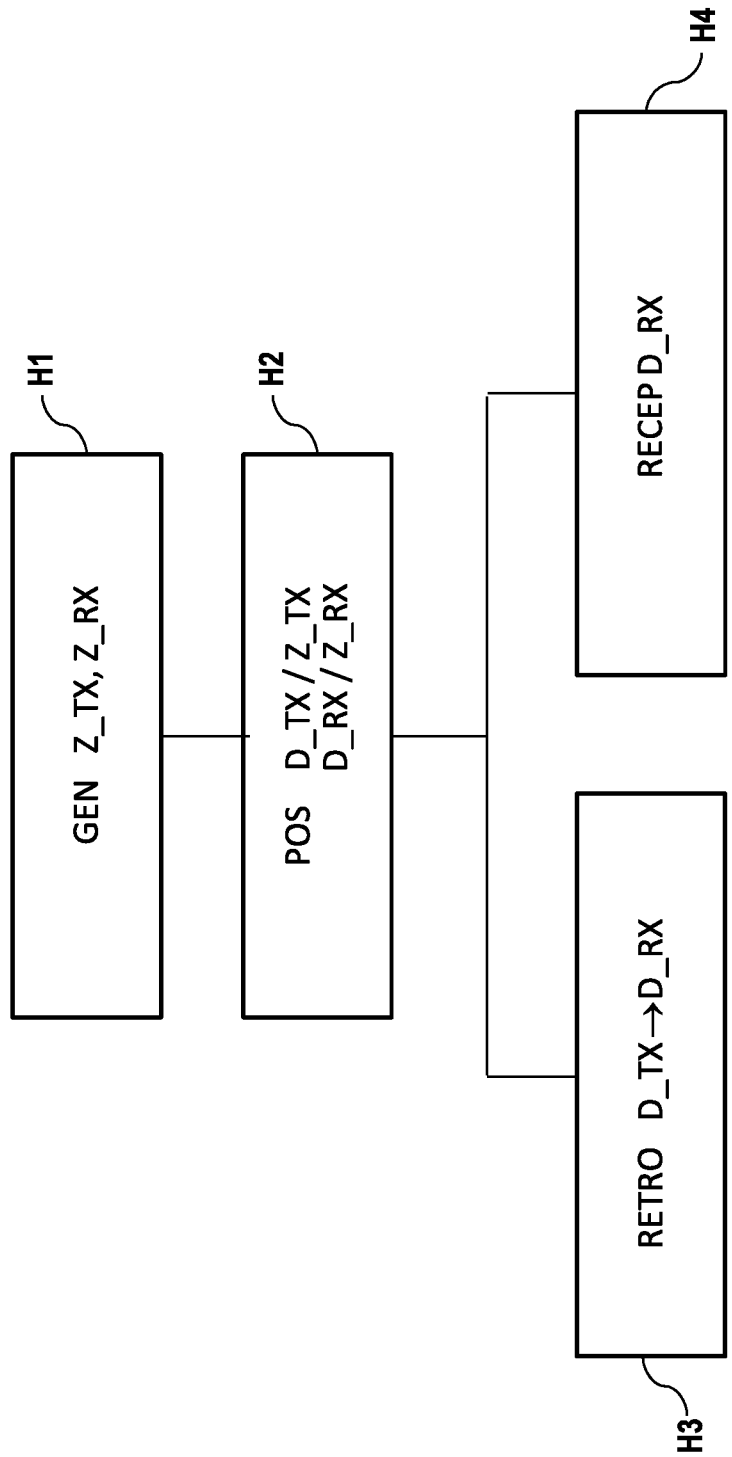
[Fig. 9]

METHOD FOR GENERATING AT LEAST ONE BACKSCATTERING ZONE OF AN AMBIENT SIGNAL AND/OR FOR RECEIVING A BACKSCATTERED AMBIENT SIGNAL

CROSS-REFERENCE TO RELATED APPLICATIONS

This Application is a Section 371 National Stage Application of International Application No. PCT/FR2020/051399, filed Jul. 29, 2020, which is incorporated by reference in its entirety and published as WO 2021/023928 A1 on Feb. 11, 2021, not in English.

PRIOR ART

The present invention belongs to the general field of telecommunications. It relates more particularly to a process for generating at least one backscattering zone, by at least one transmitter device and to at least one receiver device, of an ambient radio signal emitted by at least one source, and/or for generating at least one reception zone, by said receiver device, of said backscattered ambient signal. It also relates to a communication process between at least one transmitter device and at least one receiver device, by backscattering an ambient radio signal emitted by at least one source. The invention applies application particularly advantageously, even though in no way limiting, for applications of the IOT" type ("Internet of Things".

The technology of ambient backscattering is well known today. The technical principles on which this technology is based are described especially in the document by N. Van Huynh et al. titled "Ambient Backscatter Communications: A Contemporary Survey", in IEEE Communications Surveys & Tutorials, vol. 20, no. 4, pp. 2889-2922, Fourth quarter 2018.

In conventional terms, the backscattering of an ambient signal is performed between at least one transmitter device and at least one receiver device occupying respective fixed positions.

The ambient signal concerned corresponds to an emitted radio signal, permanently or else recurrently, by at least one source in a given frequency band. For example, it can be a television signal, a mobile telephone signal (3G, 4G, 5G), a Wi-Fi signal, a WiMax signal, etc.

To communicate with a receiver device, a transmitter device exploits the ambient signal to send data to said receiver device. More particularly, the transmitter device reflects the ambient signal to the receiver device, optionally by modulating it. The signal reflected in this way is called "backscattered signal", and is intended to be decoded by the receiver device.

The fact that no additional radio wave (in terms of a wave other than that resulting from the ambient signal) is transmitted by the transmitter device makes the technology of ambient backscattering particularly attractive. In fact, the energy cost of communication is accordingly optimised, which is especially important in the current context of the IoT where each object of current life can become a communicating object.

To execute this technology, the transmitter device is equipped with at least one antenna configured to receive the ambient signal but also backscatter them to the receiver device. The receiver device per se is configured to decode the backscattered signal.

Given this, and in practice, implementing this decoding can be understood due to the zones inside which the transmitter device and the receiver device are respectively positioned.

In fact, the transmitter and receiver devices are generally positioned in a complex propagation environment comprising elements (walls, trees, ground, etc.) likely to generate reflections and diffractions of waves emitted by the source. In this way, and schematically, two types of signals reach the receiver device: the backscattered signal, the sole carrier of data useful for performing ambient backscattering, as well as a signal coming directly from the source called "interference signal" and resulting from multiple reflections/diffractions of waves ("directly" refers here to waves not originating from the backscattered signal). Due to the so-called reflections/diffractions, said interference signal corresponds to a sum of waves which interfere with each other constructively or else destructively. As a consequence, the distribution of power generated by this interference signal is not uniform and exhibits zones where the power is locally maximal or else inversely locally minimal. The zones where the power is locally maximal (respectively locally minimal) are zones where the level of interference is the highest (respectively the least high).

The fact that the distribution of these zones is not controlled proves to be problematic in ensuring effective communication between the transmitter device and the receiver device which are traditionally arranged arbitrarily near each other.

In fact, if the receiver device is located in a locally maximal power zone, the level of interference can be sufficiently high for the execution of the decoding of the backscattered signal to be deteriorated (decoding error, poor reception of the backscattered signal), thwarting communication between the devices.

As an alternative, or else in addition, if the transmitter device is located in a zone where the radiated power is locally minimal, the variation in electromagnetic power received by the receiver device, between instants when the transmitter device backscatters and does not backscatter, may not be able to achieve a determined threshold, called "power threshold". Now, if this power threshold does arrive it conditions effective execution of the decoding.

PRESENTATION OF THE INVENTION

The aim of the present invention is to rectify all or some of the disadvantages of the prior art, especially those presented hereinabove, by proposing a solution which generates at least one zone intended for a transmitter device and/or at least one zone intended for a receiver device, so as to prevent the backscattered signal from being able to be decoded, and accordingly improve communication by ambient backscattering between these devices.

For this purpose, and according to a first aspect, the invention relates to a process generating at least one backscattering zone, by at least one transmitter device and to at least one receiver device, of an ambient radio signal emitted by at least one source, and/or for generating at least one reception zone, by said receiver device, of said backscattered ambient signal. Also, said process comprises:

a step for determining an emission constraint, when it is respected by the source, for generating at least one backscattering zone in which the received electromagnetic power is greater than a determined threshold, called "backscattering threshold", and/or generating at least one reception zone in which the received electromagnetic power is less than a determined threshold, called "reception threshold", a transmission step, by said source, with respect to said emission constraint.

In this way, a backscattering zone, such as generated by the generating process of the invention, forms a zone in which it is advantageous to position at least one transmitter device in the scope of communication by ambient backscattering. In fact, the invention offers the possibility of generating a backscattering zone inside which the received electromagnetic power is adjusted, specifically here greater than a backscattering threshold which can be determined as a function of said power threshold. In this way, placing a transmitter device in a backscattering zone generated in this way increases the probability that the backscattered signal can be decoded. This therefore improves communication by ambient backscattering between a transmitter device and a receiver device.

The above advantages apply symmetrically in the event of a reception zone such as generated by the generating process of the invention. In fact, the invention offers the possibility of generating a reception zone inside which the received electromagnetic power is adjusted, specifically here less than a reception threshold which can be determined so as to prevent an excessive level of interference. In this way, in fixing such a threshold the aim is to prevent a zone containing many instances of interference, at least sufficiently for the decoding error rate to exceed a given threshold, or considered as a valid zone for reception of the backscattered signal. Therefore, placing a receiver device in a reception zone generated in this way increases the probability that the backscattered signal can be decoded. Communication is therefore improved by ambient backscattering between a transmitter device and a receiver device.

The generating process according to the invention is also remarkable in that the emission constraint is determined so as to be utilised by said at least one source, the latter therefore participating actively in generation of a backscattering zone and/or a reception zone.

In particular embodiments, the generating process can also comprise one or more of the following characteristics, taken singly or according to all technically possible combinations.

In a first embodiment, the source is fixed and is configured to transmit in a frequency band, called "transmission bandwidth", the determining step comprising:

transmission, in a frequency band, called "working band" and included in the transmission bandwidth, and by at least one terminal the position of which is intended to be included in a backscattering or reception zone, of at least one pilot sequence to the source, estimation, by the source and assuming channel reciprocity, of a propagation channel between the source and said terminal from said at least one pilot sequence received, calculation, by the source and as a function of the propagation channel estimated, of a precoder capable of generating in the region of said terminal electromagnetic power greater than the backscattering threshold or less than the reception threshold according to whether the position of the terminal is intended to be included in a backscattering or reception zone, said emission constraint corresponding to the use by the source of said precoder for transmitting.

Advantageously, when a single terminal is considered, and:

if the position of said terminal is intended to be included in a backscattering zone, said precoder is of type transmission at maximal ratio;

or else, if the position of said terminal is intended to be included in a reception zone, said precoder is capable of forming power zeros.

Also advantageously, when at least two terminals are considered, of which a first terminal the position of which is intended to be included in a backscattering zone as well as a second terminal the position of which is intended to be included in a reception zone, said precoder is calculated so as to be of zero forcing type.

Such arrangements benefit simultaneously from generation of a backscattering zone and a reception zone. In this way, with transmitter and receiver devices placed in these zones, the invention offers the possibility of further improving communication by ambient backscattering between these devices.

In a second embodiment, the source is fixed and is configured to transmit in a frequency band, called "transmission bandwidth", the determining step comprising:

obtaining, by the source, of a grid of beams respectively associated with determined directions, and, for each beam of said grid, transmission, by the source, according to the direction of said beam, during said transmission, acquisition, in a frequency band, called "working band" and included in the transmission bandwidth, and by at least one terminal the position of which is intended to be included in a backscattering or reception zone, of a measurement of electromagnetic power received by said terminal, said determining step also comprising, once the measurements of power are acquired for each beam:

selection, by said at least one terminal, of a beam for which the power measurement is greater than said backscattering threshold or less than said reception threshold according to which the position of said terminal is intended to be included in a backscattering or reception zone, transmission, by said at least one terminal and to the source, of item of information indicating the beam selected, said emission constraint corresponding to the use by the source, on the basis of said at least one item of information, of a beam selected for transmitting.

Advantageously, at least two terminals are considered, including a first terminal the position of which is intended to be included in a backscattering zone as well as a second terminal the position of which is intended to be included in a reception zone, such that if the beams selected respectively by the first and second terminals coincide, the emission constraint corresponds to the use of the beam common to said first and second terminals.

In a third embodiment, the source is fixed and is configured to transmit in a frequency band, called "transmission bandwidth", the determining step comprising:

obtaining, by the source as well as by at least one terminal the position of which is intended to be included in a backscattering or reception zone, of a code book comprising a plurality of precoders, transmission, by the source and to said at least one terminal, of at least one determined pilot sequence, estimation, by said at least one terminal, of a propagation channel between the source and said terminal from said at least one pilot sequence received, and, for each precoder of the code book, calculation, by said at least one terminal and as a function of said precoder, of a value of electromagnetic power theoretically received by said terminal via the estimated propagation channel and in a frequency band, called "working band" and included in the transmission bandwidth, said determining step also comprising, once the power values according to each precoder are calculated:

selection, by said at least one terminal, of a precoder for which the power value is greater than said backscattering threshold or less than said reception threshold according to whether the position of said terminal is intended to be included in a backscattering or reception zone, transmission, by said at least one terminal and to the source, of an item of information indicating the precoder selected, said emission constraint corresponding to the use by the source, on the basis of said item of information, of a precoder selected for transmitting.

Advantageously, at least two terminals are considered, including a first terminal the position of which is intended to be included in a backscattering zone as well as a second terminal the position of which is intended to be included in a reception zone, such that if the precoders selected respectively by the first and second terminals coincide, the emission constraint corresponds to the use of the precoder common to said first and second terminals.

In a fourth embodiment, the source comprises a directional antenna configured to transmit in a frequency band, called "transmission bandwidth", and is associated with a travel zone, the determining step comprising:

travel of the source in at least one part of said travel zone, during travel of the source, transmission, by the source and in at least one placement, of at least one pilot sequence in at least one determined direction of the directional antenna, during said transmission, acquisition, in a frequency band, called "working band" and included in the transmission bandwidth, and by at least one terminal the position of which is intended to be included in a backscattering or reception zone, of a measurement of electromagnetic power received by said terminal, said determining step also comprising, once the travel of the source is completed, selection, by said at least one terminal, of a placement and an antenna direction associated with said placement for which the power measurement is greater than said backscattering threshold or less than the reception threshold according to which the position of said terminal is intended to be included in a backscattering or reception zone, transmission, by said at least one terminal and to the source, of an item of information indicating the selected antenna placement and direction, said emission constraint corresponding to the use by the source, on the basis of said at least one item of information, of a placement and a direction selected for transmitting.

Advantageously, at least two terminals are considered, including a first terminal the position of which is intended to be included in a backscattering zone as well as a second terminal the position of which is intended to be included in a reception zone, such that if the antenna placement and direction selected by the first terminal coincide with the antenna placement and direction selected by the second terminal, the emission constraint corresponds to the use of the placement and of the antenna direction common to said first and second terminals.

According to a second aspect, the invention relates to a communication process between at least one transmitter device and at least one receiver device, by backscattering of an ambient radio signal emitted by at least one source, said process comprising:

a step for generating at least one backscattering zone and/or for generating at least one reception zone according to a process according to any one of claims 1 to 10, a positioning step of said transmitter device in a backscattering zone if said transmitter device is not already positioned in a backscattering and/or positioning zone of said receiver device in a reception zone if said receiver device is not already positioned in a reception zone, a backscattering step, by the transmitter device, of the ambient signal, a reception step, by the receiver device, of the backscattered ambient signal.

In this way, once at least one backscattering zone and/or at least one reception zone has been determined, the transmitter and receiver devices can be advantageously positioned appropriately in these zones. The communication set up between these devices is of excellent quality, particularly when at least one backscattering zone and at least one reception zone are generated.

In particular embodiments the steps for generating, positioning, backscattering and reception are iterated recurrently.

Such arrangements take into account the variability of the environment in which the transmitter device and the receiver device are positioned.

According to a third aspect, the invention relates to a computer program comprising instructions for executing at least one part of a generating process according to the invention or of at least one part of a communication process according to the invention when said program is executed by a computer.

According to a fourth aspect, the invention relates to a recording medium readable by a computer on which a computer program according to the invention is recorded.

According to a fifth aspect, the invention relates to a system comprising means configured to execute a generating process according to the invention or means configured to execute a communication process according to the invention.

BRIEF DESCRIPTION OF THE DRAWINGS

Other characteristics and advantages of the present invention will emerge from the following description in reference to the appended drawings which illustrate an exemplary embodiment devoid of any limiting character, in which:

FIG. 1 schematically illustrates a particular embodiment of a communication system by ambient backscattering according to the invention;

FIG. 2 schematically illustrates a partial of an exemplary embodiment of a transmitter device of the communication system according to the invention;

FIG. 3 schematically illustrates a particular embodiment of a generating system according to the invention;

FIG. 4 illustrates in the form of a flowchart the principal steps of a process generating at least one backscattering zone of an ambient signal and/or of at least one reception zone of a backscattered ambient signal according to the invention;

FIG. 5 schematically illustrates a first particular embodiment of the generating process of FIG. 4;

FIG. 6 schematically illustrates a second particular embodiment of the generating process of FIG. 4;

FIG. 7 schematically illustrates a third particular embodiment of the generating process of FIG. 4;

FIG. 8 schematically illustrates a fourth particular embodiment of the generating process of FIG. 4;

FIG. 9 illustrates in the form of a flowchart the principal steps of a communication process according to the invention.

DESCRIPTION OF THE EMBODIMENTS

FIG. 1 schematically illustrates a particular embodiment of a communication system 10 by ambient backscattering according to the invention.

The communication system 10 comprises a source SO equipped with at least one directional antenna and configured to transmit, via said directional antenna and in a frequency band called "transmission bandwidth", a radioelectrical signal called "ambient signal". Said ambient signal is for example emitted permanently. Alternatively, the transmission is made recurrently.

For the rest of the description, and as illustrated by FIG. 1, the case where the ambient signal is emitted by a single source only is considered as in no way limiting. No constraint is however attached to the number of sources which can be considered within the scope of the present invention, since these sources emit in respective bandwidths the intersection of which is not empty and which also intersects a determined frequency band, as is described hereinbelow in more detail.

"Radioelectrical signal" refers here to an electromagnetic wave spreading by wireless means, the frequencies of which are contained in the traditional spectrum of electrical radio waves (a few hertz to several tens of gigahertz).

The rest of the description focuses more specifically, but in no way limiting, on an ambient signal from 4G mobile telephony emitted in the transmission bandwidth [811 MHz, 821 MHz].

It should however be specified that the invention is still applicable to other types of radioelectrical signals, such as for example a mobile telephony signal other than 4G (for example 2G, 3G, 5G), a Wi-Fi signal, a WiMax signal, a DVB-T signal, etc. In general, the skilled person knows how to determine which transmission signals can be considered for the source SO according to the embodiments envisaged and detailed hereinbelow.

The communication system 10 also comprises a transmitter device D_TX as well as a receiver device D_RX respectively configured to communicate with each other by ambient backscattering from the ambient signal emitted by the source SO.

In the rest of the description, and as illustrated by the embodiment of FIG. 1, it is considered in a non-limiting manner that the communication system 10 comprises a single transmitter device D_TX and a single receiver device D_RX. It should however be specified that the invention is also applicable to a communication system comprising a plurality of transmitter devices and/or a plurality of emitter devices.

In a manner known per se, communication by ambient backscattering consists of exploitation of the ambient signal by the transmitter device D_TX to send data to said receiver device D_RX. More particularly, the transmitter device D_TX (respectively the receiver device D_RX) is configured to carry out, from the ambient signal (respectively from the backscattered signal), processing aimed at backscattering said ambient signal (respectively aiming to decode said backscattered signal), by executing a backscattering process (respectively a decoding process).

For this purpose, the transmitter device D_TX (respectively the receiver device D_RX) comprises for example one or more processors and memory means (magnetic hard drive, electronic memory, optical disc, etc.) in which data and a computer program are stored, in the form of a set of program code instructions to be run for executing the backscattering process (respectively the decoding process).

Alternatively or in addition, the transmitter device D_TX (respectively the receiver device D_RX) also comprises a circuit or programmable logic circuits, of FPGA, PLD type, etc., and/or specialised integrated circuits (ASIC), and/or a set of discrete electronic components, etc. adapted to execute the backscattering process (respectively the decoding process).

In other terms, the transmitter device D_TX (respectively the receiver device D_RX) comprises a set of means configured as software (specific computer program) and/or hardware (FPGA, PLD, ASIC, etc.) for executing the backscattering process (respectively the decoding process).

The specific aspects concerning transmission of data by backscattering to the receiver device D_RX, as well as those concerning the decoding techniques implemented by the latter, are known to the skilled person and are not within the scope of the present invention. Consequently, they are not detailed here further.

The waves conveyed by the signals considered in the present invention are illustrated conceptually by wavy arrows in FIG. 1. More particularly, arrows F_1 and F_2 illustrate waves of the ambient signal emitted by the source SO. The waves illustrated by arrow F_1 are backscattered by the transmitter device D_TX, and the waves of the backscattered signal are here illustrated by arrow F_3. The waves illustrated by arrow F_2 are as such not backscattered and reach the receiver device D_RX directly. Only the waves illustrated by arrow F_3 carry the data which the receiver device D_RX is intended to decode.

It should be noted that FIG. 1 is given purely illustratively. In this way, it comprises for example no element likely to reflect or diffract the waves of the ambient signal. In this sense, FIG. 1 is meant to be a simplified version of the environment in which the transmitter D_TX and receiver D_RX devices are located. It should nevertheless be kept in mind that this environment in general has a complex configuration and in practice comprises elements (walls, trees, ground, etc.) capable of generating such reflections and diffractions.

FIG. 2 schematically illustrates a partial view of an exemplary embodiment of the transmitter device D_TX of FIG. 1 (the means configured as software and/or hardware are not illustrated here). The configuration of such a transmitter device D_TX is known to the skilled person.

As illustrated by FIG. 2, the transmitter device D_TX is equipped with an antenna 111 configured, in a manner known per se, to receive the ambient signal but also backscatter it to the receiver device D_RX. It should be noted that no constraint is attached to the number of antennas which can be fitted on the transmitter device D_TX.

In the example of FIG. 2, said antenna is constructed so as to present a larger dimension substantially equal to half the wavelength associated with a frequency F_C contained in the transmission bandwidth. More particularly, the frequency F_C considered here is the central frequency of the transmission bandwidth [811 MHz, 821 MHz], namely 816 MHz. In this way, said larger dimension of the antenna 111 is substantially equal to 18 cm.

In practice, the transmitter device D_TX is associated with a frequency band, called "influential bandwidth", which corresponds to the frequency band in which the antenna 111 is able to receive/backscatter signals. In this way, in the example given hereinabove in reference to FIG. 2, said influential bandwidth corresponds to an interval of frequencies centred on said frequency F_C, and whereof the amplitude is equal to a switching frequency F_E of the transmitter device D_TX. Said switching frequency F_E corresponds to a frequency at which the transmitter device D_TX shifts between distinct operating states, as is detailed later. Expressed otherwise, said influential bandwidth is equal to [F_C−F_E/2, F_C+F_E/2].

For example, said switching frequency F_E is equal to 1 MHz, and the influential bandwidth is then equal to [815.5 MHz, 816.5 MHz]. It is evident that the influential bandwidth is included in the transmission bandwidth associated with the source SO. Due to this inclusion, said influential bandwidth is qualified as "working band". "Working band" refers here to the fact that the transmitter device D_TX is compatible with the source SO, specifically therefore that the backscattering can be done for any frequency contained in said working band.

Nothing however excludes considering other values for the frequencies F_C and F_E (for example a frequency F_E between 10 Hz and 1 MHz). However it seems evident that for the transmitter device D_TX to be able to backscatter the ambient signal, said influential bandwidth should be of non-empty intersection with said transmission bandwidth, the working band corresponding therefore to this intersection. In this way, if the transmitter device D_TX is configured so as to be associated with an influential bandwidth containing the transmission bandwidth, then the working band of said transmitter device D_TX is defined as being equal to said transmission bandwidth.

The transmitter device D_TX is also associated with operating states, specifically a state called "backscattering" (the transmitter device D_TX backscatters the ambient signal) as well as a contrary state called "non-backscattering" (the transmitter device D_TX is transparent to the ambient signal). These states correspond to configurations in which said antenna 111 is connected to separate impedances. This is typically a positive impedance, or even zero, in the case of a backscattering state, and inversely theoretically infinite impedance in the case of non-backscattering.

For example, and as illustrated by FIG. 2, the transmitter device D_TX comprises two switches 112, 113 configured so that it can connect to the antenna 111, as a function of their respective positions, an impedance I_1, for example equal to 0 Ohms, or else equal to R Ohms where R is a strictly positive finite value. When at least one of the switches 112, 113 is not connected to the impedance I_1, the antenna 111 is in a configuration called "open circuit" corresponding to said non-backscattering state.

The receiver device D_RX, as such, is configured to:
receive the ambient signal emitted by the source SO, including especially the possible reflections and diffractions undergone by the waves of this signal due to elements placed in the environment containing the transmitter D_TX and receiver D_RX devices,
receive the backscattered signal coming from the transmitter device D_TX.

For this purpose, said receiver device D_RX comprises at least one reception antenna. It should be noted that no constraint is attached to the number of antennas which can be fitted on the receiver device D_RX. For example, in the embodiment of FIG. 1, the receiver device D_RX is a smartphone.

In general, no constraint, other than that related to the transmission bandwidth considered, is attached to the structural forms which can be taken respectively by the source SO and the receiver device D_RX. By way of non-limiting examples, the following configurations are possible:
the source SO is a smartphone, and the receiver device D_RX is a base station,
the source SO is a smartphone, and the receiver device D_RX is also a smartphone,
the source SO is a home gateway (or called "box Internet") emitting a Wi-Fi signal, and the receiver device D_RX is a smartphone.

In the present embodiment, the transmitter device D_TX and the receiver device D_RX are respectively positioned in a backscattering zone Z_TX and in a reception zone Z_RX (the respective delimitations of zones Z_TX and Z_RX are illustrated, purely by way of illustration, in dots in FIG. 1).

"Backscattering/reception zone" refers here to a zone generated specifically and advantageously according to the invention so that the transmitter device D_TX (respectively the receiver device D_RX) is positioned there. The way in which these zones are generated is detailed hereinbelow.

By way of non-limiting example, such a backscattering/reception zone corresponds to a known geographical zone to be highly frequented, especially during one or more periods of the day. This is for example a restaurant, a commercial zone, a station dedicated to a mode of transport (metro, bus, train, etc.), a meeting room, etc. Also, to make the tracing of a zone generated in this way easier, the latter can be advantageously signalled by visual marker means, such as for example an indicator panel bearing written mention relative to the nature of the zone in question.

Also, apart from the communication system 10, the invention relates to a generating system 100 configured to generate such backscattering/reception zones, to ensure that transmitter and receiver devices are positioned there.

FIG. 3 schematically illustrates a particular embodiment of said system 100 for generating according to the invention.

As illustrated by FIG. 3, the system 100 for generating comprises a source corresponding to the source SO of the communication system 10 described previously.

The generating system 100 also comprises two terminals, specifically:
a first terminal M_TX the position of which is intended to be included in the zone Z_TX;
a second terminal M_RX the position of which is intended to be included in the zone Z_RX.

The rest of the description focuses more specifically, but in non-limiting manner, on the case where the two terminals M_TX and M_RX are both cellular telephones, for example of smartphone type. Nothing however excludes considering terminals of another type, such as for example a tablet, a digital personal assistant, a personal computer, etc.

In keeping with the invention, the source SO as well as said first and second terminals M_TX, M_RX are configured to perform processing aimed at generating the zones Z_TX, Z_RX, executing a generating process of said zones Z_TX, Z_RX.

For this purpose, the source SO (respectively the first terminal M_TX/the second terminal M_RX) comprises for example one or more processors and memory means (magnetic hard drive, electronic memory, optical disc, etc.) in which data and a computer program are stored, in the form of a set of program code instructions to be run for executing, at least in part, the generating process.

Alternatively or in addition, the source SO (respectively the first terminal M_TX/the second terminal M_RX) also comprises a programmable logic circuit or circuits, of FPGA, PLD, type etc., and/or specialist integrated circuits (ASIC), and/or a set of discrete electronic components, etc. adapted to execute, at least in part, the generating process.

In other terms, the source SO (respectively the first terminal M_TX/the second terminal M_RX) comprises a set of means configured as software (specific computer program) and/or as hardware (FPGA, PLD, ASIC, etc.) for executing, at least in part, the generating process.

For the rest of the description, it is considered in no way limiting that the first terminal M_TX and the second terminal M_RX occupy respective fixed positions in the environment of the source SO. Nothing however excludes considering that at least one of said terminals M_TX, M_RX is mobile within said environment.

FIG. 4 shows, in the form of a flowchart, the principal steps of the generating process according to the invention.

As illustrated by FIG. 4, said generating process comprises:
- a step E1 for determining an emission constraint C_TX, when it is respected by the source SO, for generating the backscattering zone Z_TX as well as the reception zone Z_RX,
- a transmission step E2, by said source SO, with respect to said emission constraint C_TX.

In keeping with the invention, the emission constraint C_TX is determined, during step E1, such that when the source SO emits the electromagnetic power received in the zone Z_TX is greater than a determined threshold, called "backscattering threshold" S_TX.

It is in fact known to the skilled person that the decoding of the backscattered signal can be performed only if the variation in electromagnetic power received by the receiver device D_RX, between instants where the transmitter device backscatters and does not backscatter, and called "power contrast" C_P, reaches a determined threshold, called "power threshold" S_P. Such a power threshold S_P is for example defined from a decoding error rate determined as well as from the reception noise on the receiver device D_RX side.

In this way, it matters that the transmitter device D_TX is able to occupy a placement in which the power radiated by the source SO is sufficient, so that the power contrast C_P evaluated by the receiver device D_RX is increased, and so that the power threshold S_P is finally reached.

In practice, the power contrast C_P can be evaluated according to the following formula:

$$C\_P = |P\_R - P\_NR|.$$

In this formula, PR (respectively PNR) corresponds to the power received by the receiver device D_RX when the transmitter device D_TX is in the backscattering state (respectively in the non-backscattering state). In this way, a condition according to which the decoding can be carried out is reflected here by C_P>S_P. It is therefore clear that reaching the threshold S_P depends on the spread between P_R and P_NR.

It should be noted however that even though the decoding may be theoretically performed once C_P>S_P, nothing excludes a more restrictive decoding condition being imposed on the receiver device D_RX, such as for example C_P>N*S_P where N is a real number strictly larger than 1. The fact of imposing a more restrictive condition boosts the quality of communication between the transmitter D_TX and receiver D_RX devices.

In any case, the backscattering threshold S_TX is determined as a function of said power threshold S_P. The skilled person knows how to fix a threshold S_TX from which a zone can be considered for backscattering. For example, said threshold S_TX is selected sufficiently high, for example greater than the power threshold S_P.

In this way, placing the transmitter device D_TX in the zone Z_T increases the probability that the backscattered signal can be decoded, and this improves communication by ambient backscattering between the devices.

In keeping with the invention, the emission constraint C_TX is also determined such that the electromagnetic power received in the zone Z_RX is less than a determined threshold, called "reception threshold" S_RX.

The threshold S_RX considered here is typically determined as a function of a determined decoding error rate as well as reception noise considered as admissible on the receiver device D_RX side. In general, the skilled person knows how to fix a threshold S_RX from which (i.e. below which) a placement for reception can be considered.

In this way, fixing such a threshold S_RX means that the aim is to prevent a zone containing many instances of interferences, enough at least for the decoding error rate to exceed a given threshold, or considered as a zone valid for reception of the backscattered signal.

For example, said threshold S_RX is selected sufficiently low, for example in the interval [−6 dB, −2 dB], more particularly in the interval [−6 dB, −4 dB].

In this way, placing the receiver device D_RX in the zone Z_RX increases the probability that the backscattered signal may be decoded, and this improves communication by ambient backscattering between the devices.

The rest of the description aims to detail different embodiments of the generating process, and more particularly of determining step E1.

FIG. 5 schematically illustrates a first particular embodiment of the generating process of FIG. 4 in which the source SO is fixed and configured to transmit data with high spectral efficiency due to the formation of beams (also called "beamforming").

As illustrated by FIG. 5, step E1 for determining comprises, in this first embodiment, transmission E1_10, in the working band and by each of the terminals M_TX, M_RX, of at least one pilot sequence to the source SO.

The transmissions respectively associated with the first terminal M_TX and the second terminal M_RX are for example synchronised. Alternatively, these transmissions are desynchronised.

The determining Step E1 also comprises estimation E1_11, by the source SO and assuming channel reciprocity, of a propagation channel CA_TX, CA_RX between the source SO and each of the terminals M_TX, M_RX from the received pilot sequences.

The estimation of a propagation channel in a wireless network is a classic operation known to the skilled person, and consequently is not detailed here further. It is based especially on the sending of said sequences comprising pilot symbols on the propagation channel which are to be estimated. The assumption of reciprocity for estimation of the channel is also known to the skilled person who then understands that the communication context between the M_TX, M_RX terminals and the source SO, for sending/ reception pilot sequences, corresponds to a TDD mode (acronym of "Time Division Duplex").

Finally, step E1 for determining also comprises calculation E1_12, by the source SO and as a function of the estimated propagation channels CA_TX, CA_RX, of a precoder capable of generating in the region of the first terminal M_TX an electromagnetic power greater than the backscattering threshold S_TX, and in the region of the second terminal M_RX an electromagnetic power less than the reception threshold S_TX. More particularly, in this first embodiment, said precoder is of zero forcing type (or ZF for "Zero Forcing").

In a manner known per se, such a precoder ZF simultaneously creates focusing of at least part of the radiation of the source SO onto the first terminal M_TX, as well as an absence of radiation in the region of the second terminal M_RX.

It should also be noted that the setting of a precoder of ZF type for generating in the region of the first terminal M_TX a level of power greater than the backscattering threshold S_TX, as well as a level of power less than the reception threshold S_TX in the region of the second terminal M_RX, is a process known from the prior art.

According to such execution, each zone Z_TX, Z_RX for example substantially takes the form of a circle centred on the associated terminal M_TX, M_RX and the radius of which is of the order of a quarter of the wavelength associated with the frequency F_C.

The emission constraint C_TX eventually corresponds to the use by the source SO, during transmission step E2, of said precoder for transmitting.

FIG. 6 schematically illustrates a second particular embodiment of the generating process of FIG. 4 in which the source SO is fixed and configured to transmit data with high spectral efficiency thanks to the formation of beams ("beamforming").

For execution of this second mode, each terminal M_TX, M_RX comprises acquisition means configured to acquire, in the working band, measurements of electromagnetic power received by said terminal M_TX, M_RX.

In conventional terms, said acquisition means comprise an acquisition chain connected to a sensitive element configured to supply an electric analog signal representative of the measured electromagnetic power. In the present exemplary embodiment, said sensitive element corresponds to a reception antenna fitted on the terminal M_TX, M_RX.

Said acquisition chain comprises for example and acquisition card configured to condition said signal electrical. The conditioning implemented by the acquisition card comprises for example, in a manner known per se, amplification and/or filtering and/or current-power conversion. In general, the configuration of such acquisition means is well known to the skilled person, and is therefore not detailed here further.

As illustrated by FIG. 6, the determining step E1 comprises, in this second embodiment, obtaining E1_20, by the source SO, a grid G_F of beams (noted G_F(1), G_F(2), etc.) respectively associated with determined directions.

A direction of beam G_F(i) corresponds to a combination of directions of the space, such a combination can be shown algebraically in the form of a vectoral representation. Such a vector associated with a beam G_F(i) represents per se a precoder which, when utilised by the source SO for transmitting, focuses the transmission in the direction of the beam G_F(i) in question. Also, by adopting the abovementioned vectoral representation, the grid G_F of beams can be illustrated in the form of a matrix.

For example, the beams G_F(i) of the grid are determined by means of a method of Discrete Fourier Transform ("DFT", for Discrete Fourier Transform). Such a method is for example described in the document: "DFT beamforming for more accurate estimate of signal DOA with application to improving DS/CDMA receiver performance", T. B. Vu, Electronic Letters, vol. 36, no. 9, pp. 834-836, 2000.

In a particular exemplary embodiment, the grid G_F of beams is predetermined. For example, said grid G_F is stored (in the form of a matrix) in memory means annexed to the source SO, such as for example a database stored on a server. Since these attached memory means are separate to the memory means of the source SO, obtaining the grid G_F of beams corresponds to transmission of said grid to the source SO by communication means fitted on the latter. Once said grid G_F is transmitted, the source SO stores it in its memory means.

No constraint is attached to the configuration of the communication means capable of transmission of the grid G_F of beams, which can be wired or wireless, as well as using any known type of transport protocol.

Alternatively, the grid G_F of beams is determined directly by the source SO. For example, obtaining the grid G_F of beams corresponds to calculation of the coefficients of the matrix associated with said grid G_F by the source SO.

Once the grid G_F of beams is obtained, the determining step E1 also comprises, for each beam G_F(i) of the grid G_F:

transmission E1_21, by the source SO, according to the direction of the beam G_F(i), during said transmission E1_21, acquisition E1_22, in the working band, and by each of the terminals M_TX, M_RX, of a measurement of electromagnetic power P_TX(i), P_RX(i) received by said terminal M_TX, M_RX.

In the second embodiment illustrated by FIG. 6, said determining step E1 also comprises, once the measurements of power are acquired for each beam, selection E1_23, by each terminal M_TX, M_RX, of a beam G_F(i), G_F(j) for which the power measurement P_TX(i), P_RX(j) is greater than said backscattering threshold S_TX or less than said reception threshold S_RX according to which the position of said terminal M_TX, M_RX is intended to be included in a backscattering zone Z_TX or for the reception Z_RX.

Preferably, if several power measurements P_TX(i) acquired by the first terminal M_TX (respectively several power measurements P_RX(j) acquired by the second terminal M_RX) are greater than the backscattering threshold S_TX (respectively less than the reception threshold S_RX), the beam selected from the beams associated with said measurements corresponds to the beam the associated power measurement of which is maximal (respectively the power measurement of which is minimal).

Nothing however excludes considering random selection, by the first terminal M_TX (respectively the second terminal M_RX), of a beam from the beams of which the associated power measurements are greater than the backscattering threshold S_TX (respectively less than the reception threshold S_TX) where appropriate.

The determining step E1 also comprises transmission E1_24, by each of the terminals M_TX, M_RX and to the source SO, of an item of information INFO indicating the selected beam. The transmission E1_24 is done for example via a signalling message which can be defined in a telecommunications standard.

Such an item of information INFO corresponds typically to the index i of the selected beam G_F(i).

Finally, in said second embodiment, if the beams selected respectively by the first and second terminals M_TX, M_RX coincide (for example the indices of the selected beams are equal), the emission constraint C_TX corresponds to the use by the source SO, during transmission step E2 and on the basis of said item of information INFO, of the beam common to said first and second terminals M_TX, M_RX for transmitting.

It should be noted that if the beams selected respectively by the first and second terminals M_TX, M_RX do not coincide, then the emission constraint C_TX corresponds to the use, by the source SO, of one or the other of said selected beams.

FIG. 7 schematically illustrates a third particular embodiment of the generating process of FIG. 4 in which the source SO is fixed and configured to transmit data with high spectral efficiency thanks to the formation of beams ("beamforming").

As illustrated by FIG. 7, determining step E1 comprises, in this third embodiment, obtaining E1_30, by the source SO as well as by each of the terminals M_TX, M_RX, a code book L_C (called "codebook") comprising a plurality of precoders (noted LC(1), LC(2), etc.).

The fact of considering precoders LC(i) combined inside a code book L_C is well known to the skilled person who typically refers to a telecommunications standard to gain access to such a code book L_C. In this way, in the present exemplary embodiment (ambient signal of mobile telephony 4G), the code book L_C is supplied by a standard such as defined in the document: "3GPP TS 36.211 V15.5.0 (2019-03)".

Said code book L_C is for example stored in annexed memory means of the source SO and terminals M_TX, M_RX, such as for example a database stored on a server. Since these annexed memory means are distinct from the memory means of the source SO and the terminals M_TX, M_RX, obtaining the code book L_C corresponds to transmission of said book to the source SO and to the terminals M_TX, M_RX by communication means respectively fitted on these latter. Once the code book L_C is transmitted, the source SO and the terminals M_TX, M_RX store it in their respective memory means.

No constraint is attached to the configuration of the communication means capable of transmitting the code book L_C, which can be wired or wireless, as well as using any type of known transport protocol.

The determining step E1 also comprises transmission E1_31, by the source SO and to each of the terminals M_TX, M_RX, of at least one pilot sequence.

The transmissions respectively associated with the first terminal M_TX and the second terminal M_RX are synchronised for example. Alternatively, these transmissions are desynchronised.

The determining step E1 also comprises estimation E1_32, by each of the terminals M_TX, M_RX, of a propagation channel CA_TX, CA_RX between the source SO and said terminal M_TX, M_RX from the received pilot sequences.

As has been mentioned earlier, the estimation of a propagation channel in a wireless network, from pilot sequences, is a classic operation known to the skilled person, and consequently not detailed here further.

Once the propagation channels CA_TX, CA_RX are estimated between the source SO and the terminals M_TX, M_RX, the determining step E1 also comprises, for each precoder LC(i) of the code book L_C, calculation E1_33, by each of the terminals M_TX, M_RX and as a function of said precoder L_C(i), of a value of electromagnetic power Pt_TX(i), Pt_RX(i) theoretically received by said terminal M_TX, M_RX in the working band and via the propagation channel estimated for this terminal M_TX, M_RX.

In other words, on completion of said calculations each terminal M_TX, M_RX is associated with a determined number of power values Pt_TX(i), Pt_RX(i), this number being equal to the number of precoders LC(i) recorded in the code book L_C.

It should be noted that the skilled person knows how to perform such calculations of theoretical power received as a function of a considered precoder.

In the third embodiment illustrated by FIG. 7, said determining step E1 also comprises, once said power values according to each precoder are calculated, selection E1_34 by each terminal M_TX, M_RX of a precoder L_C(i), L_C(j) for which the power value Pt_TX(i), Pt_RX(j) is greater than said backscattering threshold S_TX or less than said reception threshold S_RX according to whether the position of said terminal is intended to be included in a backscattering zone Z_TX or reception zone Z_RX.

Preferably, if several power values Pt_TX(i) calculated by the first terminal M_TX (respectively several power measurements Pt_RX(j) calculated by the second terminal M_RX) are greater than the backscattering threshold S_TX (respectively less than the reception threshold S_RX), the precoder selected from the precoders associated with said values corresponds to the precoder whereof the associated power value is maximal (respectively the power value of which is minimal).

Nothing however excludes considering random selection by the first terminal M_TX (respectively the second terminal M_RX) of a precoder from among the precoders the associated power values of which are greater than the backscattering threshold S_TX (respectively less than the reception threshold S_TX) where appropriate.

The determining step E1 also comprises transmission E1_35, by each of the terminals M_TX. M_RX and to the source SO, of an item of information INFO indicating the selected precoder. Transmission E1_35 is done for example via a signalling message which can be defined in a telecommunications standard.

Such an item of information INFO corresponds typically to the index i of the selected precoder L_C(i).

Finally, in said third embodiment, if the precoders selected respectively by the first and second terminals M_TX, M_RX coincide (for example the indices of the precoders selected are equal), the emission constraint C_TX corresponds to the use by the source SO, during transmission step E2 and on the basis of said item of information INFO, of the precoder common to said first and second terminals M_TX, M_RX for transmitting.

It is noted that if the precoders selected respectively by the first and second terminals M_TX, M_RX do not coincide, the emission constraint C_TX corresponds to use by the source SO of one or the other of said precoders.

The invention has been described to date by considering that the source SO is fixed. The invention is nevertheless not limited to such a configuration of the source SO.

FIG. 8 schematically illustrates a fourth particular embodiment of the generating process of FIG. 4 in which the source SO is able to move and is configured to transmit data directionally.

For executing this fourth mode, each terminal M_TX, M_RX comprises acquisition means presenting technical characteristics identical to those described hereinabove within the scope of the second embodiment (FIG. 6).

The source SO comprises orientation means of the directional antenna. In this way, via its orientation means the source SO is capable of modifying the direction in which the directional antenna points even as the source SO does not modify its position. Such orientation means are of type known per se, such as for example an electric motor dedicated to said orientation.

Also, for executing said fourth mode, the source SO comprises displacement means (not illustrated in the figures) in the environment which surrounds it.

For example, said displacement means comprise drive means, such as for example at least one electric motor, as well as guide means, such as wheels for example. Nothing however excludes considering other drive means, such as for example a thermal motor, as well as other guide means, such as for example crawler tracks.

Preferably, the source SO takes the form of a robot comprising an electric motor and wheels.

Apart from the fact of enabling generation of at least one backscattering zone Z_TX and/or at least one reception zone Z_RX, the means configured as software and/or hardware fitted on the source SO also steer its movement.

For this purpose, these means comprise for example a control module (not illustrated in figures) configured to generate displacement commands of the source SO.

For example, said commands are generated without assistance. In other words, the source SO is able to move autonomously, that is, without intervention of an operator.

Alternatively, steering of the source SO is done in an assisted manner by an operator who remotely generates command signals, these command signals being then transmitted to the source SO which moves as a function of the data conveyed in these signals. For this purpose, the source SO comprises for example communication means for the reception of said command signals, said signals being then processed by the control module. These communication means are supported, as is known per se, on a communication interface able to exchange data between said operator and the source SO. No constraint is attached to the nature of this communication interface, which can be wired or wireless, so as to allow the exchange of data according to any protocol known to the skilled person.

For the rest of the description, it is considered in no way limiting that the operation of the source SO is assured by electrical energy which the latter is capable of storing.

For example, said electrical energy is contained in an electric battery integrated into the source SO, and which can be for example recharged by means of solar panels fitted on said source SO, or else by capacitive effect, such that said source SO is autonomous in terms of power. Alternatively, recharging of said battery is done via a link to the domestic electrical network.

Nothing however excludes considering other types of energy, such as for example fossil energy, especially in the event where the source SO is equipped with a thermal motor. Finally, nothing neither excludes considering a mix of energy (electrical and thermal).

In other words, and in general, no constraint is attached to the energy considered for the operation of the source SO, or even to the way in which this energy is obtained by the latter.

Also, the source SO is associated with a zone, called "travel zone" Z_D, within which it can move.

Said travel zone Z_D corresponds typically to a geographic zone (on the ground) defined from the radiation pattern of the directional antenna fitted on the source SO.

More particularly, it is possible to determine, when the source SO is fixed, and from the radiation pattern of said directional antenna, a first coverage zone (respectively a second coverage zone) corresponding to a geographic zone within which the radiated power is greater than the backscattering threshold S_TX (respectively less than the reception threshold S_RX). It is of course understood that this first coverage zone (respectively this second coverage zone) is likely to evolve during travel of the source SO, once said travel is done according to a sufficient distance. Also, and in practice, the travel zone Z_D is defined so as to present a larger dimension greater than or equal to the maximum between the largest dimension of the first coverage zone and the largest dimension of the second coverage zone.

Nothing however excludes considering a travel zone Z_D of which the largest dimension is defined differently, for example as being greater than or equal to the total of the largest dimension and of the largest dimension of the first coverage zone.

In general, no constraint is attached to the way in which said travel zone Z_D is defined. For example, on the basis or not of the radiation pattern, a plurality of parameters can be taken into account, such as for example an operational power autonomy of the source SO, the configuration of the environment in which the source SO (obstacles, etc.) is located, the prediction of a density of presence of transmitter D_TX and/or receiver D_RX devices, etc.

As illustrated by FIG. 8, the determining step E1 comprises travel E1_40 of the source SO in at least one part of the zone Z_D.

Such travel of the source SO allows the latter to scan at least in part the zone Z_D with the aim of testing placements and directions of antenna from which it is possible to generate at least one backscattering zone Z_TX and/or at least one reception zone Z_RX.

"Travel" refers here to a phase of exploration, such a phase which can comprise continuous travel (that is, without stopping within said part) between respectively initial and final placements in which the source SO is fixed, or else which can be made in phases (that is, one or more intermediate stops within said part prior to reaching a final placement).

In a particular exemplary embodiment, travel of the source SO is made autonomously, that is, without external assistance. For example, the source SO is configured to analyse the environment in which it is located to detect any possible obstacles which it can then circumvent. Such detection is typically performed thanks to imaging means (for example a camera) fitted on the source SO, as well as thanks to processing performed by said source SO which aims to analyse images obtained with said imaging means. Such processing is well known to the skilled person, and is therefore not detailed here further.

In another particular exemplary embodiment, travel of the source SO is made in an assisted manner, for example by an operator able to remotely control the movements of the source SO.

Irrespective of the execution being considered (autonomous or assisted), travel of the source SO can be performed according to a determined trajectory, such as for example a spiral, a line, in slots, etc.

Alternatively, displacement of the source SO can be performed via a non-determinist approach.

In general, no constraint is attached to the trajectory followed by the source SO.

Also, said part of the zone Z_D is for example configured so as to include the initial placement of the source SO.

Alternatively, said part does not include the initial placement, such that the source SO undertakes previous travel so as to join said part which is then travelled.

In general, no constraint is attached to the form presented by said part of the zone Z_D. Also, the travel of the source SO can be made over a determined period which can be set such that the form of said part can depend on this determined period.

In a particular exemplary embodiment, travel of the source SO is made in the entire zone Z_D. Proceeding in this manner maximises the number of placements and directions likely to be tested throughout the generating process.

During travel of the source SO, the determining step E1 also comprises transmission E1_41, by the source SO and in at least one placement A(i), of at least one pilot sequence in at least one determined direction D(i,j) of the directional antenna (i and j are whole numbers greater than or equal to 1).

One direction D(i,j) of the directional antenna is expressed conventionally in the form of a couple of angular coordinates representing respectively the azimuth and the elevation of the antenna. It is of course understood that the number of directions D(i,j) considered during the transmission E1_41 is greater than or equal to the considered number of placements A(i) (i.e. for a given index i, the index j is greater than or equal to 1).

In a particular embodiment, the number of directions D(i,j) considered during the transmission E1_41 is strictly greater than the considered number of placements A(i). For this to happen, the direction of the directional antenna is modified due to the orientation means described previously. For example, in a placement A(i), the source SO emits pilot sequences in several directions whereof the respective elevation components are all identical, but whereof the respective components of azimuth are phased according to a pitch equal to one degree so as to cover a determined angular sector, for example an angular sector equal to [0°, 360°].

It should be noted that no constraint is attached to the number of directions of transmission which can be considered in a placement A(i).

Also, the transmission E1_41 of a pilot sequence is preferably performed when idle (fractionated exploration phase). In other words, during its travel the source SO marks a stop in a placement A(i) once it wants to transmit.

Nothing however excludes considering that transmission is made while the source SO is in motion.

No constraint is attached to the number of placements A(i) which can be considered for transmitting pilot sequences. Also, if a plurality of placements A(i) is considered, these placements A(i) can be separated by a pitch of determined distance, for example which can be set. They can be also separated by a pitch of determined time, for example which can be set, in which case the speed of the source 11 can be adjusted to respect said time pitch.

The determining step E1 also comprises, during said transmission E1_41, acquisition E1_42, in the working band, and by each of the terminals M_TX, M_RX, of a measurement of electromagnetic power P_TX(i), P_RX(i) received by said terminal M_TX, M_RX.

In the fourth embodiment illustrated by FIG. 8, said determining step E1 also comprises, once travel of the source SO is completed, a selection E1_43, by each terminal M_TX, M_RX, of a placement A(m), A(k) and an antenna direction D(m,n), D(k, l) associated with said placement A(m), A(k) for which the power measurement P_TX(i), P_RX(k) is greater than said backscattering threshold S_TX or less than said reception threshold S_RX according to which the position of said terminal M_TX, M_RX is intended to be included in a backscattering Z_TX or reception Z_RX zone.

Preferably, if several power measurements P_TX(m) acquired by the first terminal M_TX (respectively several power measurements P_RX(k) acquired by the second terminal M_RX) are greater than the backscattering threshold S_TX (respectively less than the reception threshold S_RX), the selected antenna placement and direction, from the placements and directions associated with said measurements, corresponds to the placement and to the direction whereof the power measurement associated is maximal (respectively whereof the power measurement is minimal).

Nothing however excludes considering random selection, by the first terminal M_TX (respectively the second terminal M_RX), of a placement and a direction from among the placements and the directions whereof the associated power measurements are greater than the backscattering threshold S_TX (respectively less than the reception threshold S_RX) where appropriate.

Also, the determining step E1 comprises transmission E1_44, by each of the terminals M_TX, M_RX and to the source SO, of an item of information INFO indicating the selected placement and the direction. The transmission E1_44 is performed for example via a signalling message which can be defined in a telecommunications standard.

Finally, in said fourth embodiment, if the antenna placement and direction selected by the first terminal M_TX coincide with the antenna placement and direction selected by the second terminal M_RX, the emission constraint C_TX corresponds to the use by the source SO, during transmission step E2 and on the basis of said item of information INFO, of the placement and of the antenna direction common to said first and second terminals M_TX, M_RX for transmitting.

It is noted that if the placements and/or the directions selected respectively by the first and second terminals M_TX, M_RX do not coincide, the emission constraint C_TX corresponds to the use by the source SO of the placement and of the selected antenna direction by one or the other of said terminals M_TX, M_RX.

The invention has been described to date by considering two terminals only, specifically the first terminal M_TX and the second terminal M_RX. The invention nevertheless still applies to a number of terminals different from two. In this way, nothing excludes considering the configuration according to which the generating system 100 is constituted by the source SO and by one or more backscattering terminals (respectively one or more reception terminals).

In this way, and as relates more particularly to the first embodiment (FIG. 5), nothing excludes considering an alternative in which a single terminal would be considered. According to this alternative, the calculation E1_12 of the precoder is performed so as to allow generation in the region of said terminal of electromagnetic power:

greater than the backscattering threshold if the position of said terminal is intended to be included in a backscattering zone Z_TX, or less than the reception threshold if the position of said terminal is intended to be included in a reception zone Z_RX.

For example, if the position of said terminal is intended to be included in a backscattering zone Z_TX, said precoder is of type transmission at maximal ratio (or MRT for "Maximum Ratio Transmission"). In other words, said precoder MRT is intended to be used so that the source SO focuses essentially on said terminal to generate maximum power.

Inversely, if the position of said terminal is intended to be included in a reception zone Z_RX, said precoder is for example capable of forming power zeros. Such a precoder is well known to the skilled person, and consists essentially of letting the source SO generate signals of opposite signs (and therefore capable of cancelling each other out) in the region of the considered reception terminal. By way of example the following scientific publication can be cited: "Null forming method by phase control of selected array elements using plane-wave synthesis", I. Chiba, S. Mano, Antennas and Propagation Society Symposium, pp. 70-73, 1987.

Also, when several terminals of the same type are considered (for backscattering or for reception), nothing neither excludes considering that the respective positions of all or some of said terminals of the same type are intended to be included in the same zone (for backscattering or reception according to the type of considered terminals). Alternatively, the respective positions of the terminals are intended to be included in zones distinct from each other.

Also, the invention has been described to date by considering embodiments of the generating process based on use of one or more terminals M_TX, M_RX. Proceeding in this way advantageously configures the source SO, via determination of the emission constraint C_TX, to transmit specifically (precoder of a particular type, selection of a precoder or a beam from a plurality of precoders or beams) as a function of the positions occupied by the terminal or the terminals M_TX, M_RX during determining step E1. The terminal or the terminals M_TX, M_RX therefore play(s) the role of support to cause the source SO to transmit specifically. In other terms, when the terminal or the terminals M_TX, M_RX are used during the generating process, the determining step E1 aims to "teach" the source SO the way in which the latter has to transmit to generate one or more zones Z_TX, Z_RX.

But nothing excludes considering other embodiments of the generating process in which no terminal is used.

For example, in the event where the source SO is fixed and is configured to transmit data with high spectral efficiency thanks to the formation of beams ("beamforming"), the determining step E1 can comprise obtaining, by the source SO, of a predetermined precoder executing a discrete Fourier transform (as mentioned hereinabove in the description made in reference to FIG. 6), said emission constraint corresponding to the use by the source SO of said precoder for transmitting during transmission step E2. In this example, the location of the backscattering or reception Z_TX or Z_RX zone(s) is not conditioned by the presence of one or more terminals. As the precoder is fully predetermined, it is possible to know in advance (for example via digital simulations) the distribution of electromagnetic power in the environment surrounding the source SO. In this way, the positioning of a backscattering zone Z_TX and/or a reception zone Z_RX is conditioned here by said distribution of power. In practice, in this embodiment, a backscattering zone Z_TX is typically selected so as to be illuminated by the principal transmission lobe of the source SO, or else by a secondary lobe of sufficient power. A reception zone Z_RX is as such typically selected not to be illuminated by the transmission lobes of the source SO.

Also, according to another aspect, the invention relates also to a communication process by ambient backscattering between the transmitter device D_TX and the receiver device D_RX. Said communication process is based advantageously on the generating process previously described to allow effective communication between these devices within the communication system 10 such as described previously.

FIG. 9 shows, in the form of a flowchart, the principal steps of the communication process according to the invention. Said communication process is here detailed, by way of illustration, in reference to the communication system 10 such as described previously (FIG. 1).

As illustrated by FIG. 9, said communication process comprises in a first time a step H1 for generating of the backscattering zone Z_TX and for generating of the reception zone Z_RX according to the generating process of the invention.

Once said zones are generated, the communication process comprises a step H2 for positioning of said transmitter device D_TX in the backscattering zone Z_TX if said transmitter device D_TX is not already positioned there, and positioning of said receiver device D_RX in the reception zone Z_RX if said receiver device D_RX is not already positioned there.

No constraint is attached in the way in which said positioning is performed. For example, in the event where said devices D_TX, D_RX take the general form of a smartphone and said zones Z_TX, Z_RX are identified by means of indicator panels, the respective users of the devices D_TX, D_RX are responsible for positioning these latter as a function of the indications of said panels.

Once the positioning step H2 is completed, the communication process comprises a backscattering step H3, by the transmitter device D_TX, of the ambient signal emitted by the source SO (i.e. the transmitter device D_TX shifts from the non-backscattering state to the backscattering state unless it was already in this state previously). It also comprises a reception step H4, by the receiver device D_TX, of the backscattered ambient signal by the transmitter device D_TX.

In a particular embodiment (not illustrated in FIG. 9), said steps for generating H1, positioning H2, backscattering H3 and reception H4 are iterated recurrently.

The fact of performing these steps recurrently takes into account the variability of the environment in which are positioned the transmitter device D_TX and the receiver device D_RX.

For example, said steps are iterated periodically, for example once per day in an environment in which the distribution of power generated by the source SO is stable, or else more, for example once every hour if the distribution of power is likely to evolve substantially every hour.

The invention claimed is:

1. A process implemented by at least one source and comprising:
   generating:
      at least one backscattering zone, by at least one transmitter device and to at least one receiver device, of an ambient radio signal emitted by the at least one source, the backscattering zone forming a backscattered ambient signal, and/or
      at least one reception zone, by the at least one receiver device, of said backscattered ambient signal,
   said generating comprising:
   determining an emission constraint that, when the emission constraint is applied by the at least one source to emit the ambient radio signal, the at least one backscattering zone is generated in which a received electromagnetic power is greater than a determined threshold, called backscattering threshold, and/or the at least one reception zone is generated in which the received electromagnetic power is less than a determined threshold, called reception threshold; and transmitting, by said source, with respect to said emission constraint.

2. The process according to claim 1, in which the source is fixed and is configured to transmit in a frequency band, called transmission bandwidth, and wherein the determining comprises:

transmission, in a frequency band, called working band and included in the transmission bandwidth, and by at least one terminal a position of which is intended to be included in the backscattering zone or reception zone, of at least one pilot sequence to the source, estimation, by the source and assuming channel reciprocity, of a propagation channel between the source and said at least one terminal from said at least one pilot sequence received, calculation, by the source and as a function of the estimated propagation channel, of a precoder capable of generating in a region of said terminal electromagnetic power greater than the backscattering threshold or less than the reception threshold according to which the position of the at least one terminal is intended to be included in the backscattering or reception zone, said emission constraint corresponding to use by the source of said precoder for transmitting.

3. The process according to claim 2, wherein the at least one terminal comprises a single terminal, and:

if the position of said terminal is intended to be included in the backscattering zone, said precoder is of maximal ratio transmission type;

or else, if the position of said terminal is intended to be included in the reception zone, said precoder is capable of forming power zeros.

4. The process according to claim 2, wherein the at least one terminal comprises at least two terminals, including a first terminal the position of which is intended to be included in the backscattering zone as well as a second terminal the position of which is intended to be included in the reception zone, said precoder being of zero forcing type.

5. The process according to claim 1, in which the source is fixed and is configured to transmit in a frequency band, called transmission bandwidth, and wherein the determining comprises:

obtaining, by the source, a grid of beams respectively associated with determined directions, and, for each beam of said grid, transmission, by the source, according to the direction of said beam, during said transmission, acquisition, in a frequency band, called working band and included in the transmission bandwidth, and by at least one terminal a position of which is intended to be included in the backscattering zone or for the reception, of a measurement of electromagnetic power received by said terminal, said determining also comprising, once the electromagnetic power measurements acquired for each beam:

selection, by said at least one terminal, of a beam for which the power measurement is greater than said backscattering threshold or less than said reception threshold according to which the position of said terminal is intended to be included in the backscattering or reception zone, transmission, by said at least one terminal and to the source, of an item of information indicating the selected beam, said emission constraint corresponding to use by the source, on the basis of said at least one item of information, of a beam selected for transmitting.

6. The process according to claim 5, in which the at least one terminal comprises at least two terminals, including a first terminal the position of which is intended to be included in the backscattering zone as well as a second terminal the position of which is intended to be included in the reception zone, such that if the beams selected respectively by the first and second terminals coincide, the emission constraint corresponds to the use of the beam common to said first and second terminals.

7. The process according to claim 1, in which the source is fixed and is configured to transmit in a frequency band, called transmission bandwidth, and wherein the determining comprises:

obtaining, by the source as well as by at least one terminal a position of which is intended to be included in the backscattering zone or reception zone, of a code book comprising a plurality of precoders, transmission, by the source and to said at least one terminal, of at least one determined pilot sequence, estimation, by said at least one terminal, of a propagation channel between the source and said terminal from said at least one received pilot sequence, and, for each precoder of the code book, calculation, by said at least one terminal and as a function of said precoder, of a value of electromagnetic power theoretically received by said terminal via the propagation channel estimated and in a frequency band, called working band and included in the transmission bandwidth, said determining also comprising, once the power values according to each precoder are calculated:

selection, by said at least one terminal, of a precoder for which the power value is greater than said backscattering threshold or less than said reception threshold according to which the position of said terminal is intended to be included in the backscattering or reception zone, transmission, by said at least one terminal and to the source, of an item of information indicating the selected precoder, said emission constraint corresponding to use by the source, on the basis of said item of information, of a precoder selected for transmitting.

8. The process according to claim 7, in which the at least one terminal comprises at least two terminals are considered, including a first terminal the position of which is intended to be included in the backscattering zone as well as a second terminal the position of which is intended to be included in the reception zone, such that if the precoders selected respectively by the first and second terminals coincide, the emission constraint corresponds to use of the precoder common to said first and second terminals.

9. The process according to claim 1, in which the source comprises a directional antenna configured to transmit in a frequency band, called transmission bandwidth, and is associated with a travel zone, the determining comprising:

a travel of the source in at least one part of said travel zone, during the travel of the source, transmission, by the source and in at least one placement, of at least one pilot sequence in at least one determined direction of the directional antenna, during said transmission, acquisition, in a frequency band, called working band and included in the transmission bandwidth, and by at least one terminal the position of which is intended to be included in the backscattering zone or reception zone, of a measurement of electromagnetic power received by said terminal, said determining also comprising, once the path of the source is completed, selection, by said at least one terminal, of a placement and an antenna direction associated with said placement for which the power measurement is greater than said backscattering threshold or less than the reception threshold according to which the position of said terminal is intended to be included in the backscattering or reception zone, transmission, by said at least terminal and to the source, of an item of information indicating the selected antenna placement and direction, said emission constraint corresponding to the use by the source, on the basis of said at least one item of information, of a placement and a direction selected for transmitting.

10. The process according to claim 9, in which the at least one terminal comprises at least two terminals, including a first terminal the position of which is intended to be included in the backscattering zone as well as a second terminal the position of which is intended to be included in the reception zone, such that if the antenna placement and direction selected by the first terminal coincide with the antenna placement and direction selected by the second terminal, the emission constraint corresponds to use of the placement and of the antenna direction common to said first and second terminals.

11. The process according to claim 1, further comprising:
positioning said at least one transmitter device in the backscattering zone if said transmitter device is not already positioned in the backscattering zone and/or positioning of said at least one receiver device in the reception zone if said receiver device is not already positioned in the reception zone,
backscattering, by the at least one transmitter device, of the ambient signal, and
reception, by the receiver device, of the backscattered ambient signal.

12. The process according to claim 11, in which the generating, positioning, backscattering and reception are iterated recurrently.

13. At least one non-transitory computer readable medium having stored thereon instructions which, when executed by at least one processor of at least one source, cause the at least one processor to implement a process of generating at least one backscattering zone, by at least one transmitter device and to at least one receiver device, of an ambient radio signal emitted by the at least one source, the backscattering zone forming a backscattered ambient signal, and/or at least one reception zone, by the at least one receiver device, of said backscattered ambient signal, when the instructions are executed by the processor, the process comprising:
determining an emission constraint that, when the emission constraint is applied by the source to emit the ambient radio signal, the at least one backscattering zone is generated in which a received electromagnetic power is greater than a determined threshold, called backscattering threshold, and/or the at least one reception zone is generated in which the received electromagnetic power is less than a determined threshold, called reception threshold; and
transmitting the ambient signal, by at least one source said source, with respect to said emission constraint.

14. A system comprising
at least one source configured to emit an ambient radio signal for generating:
at least one backscattering zone, by at least one transmitter device and to at least one receiver device, of the ambient radio signal emitted by the at least one source, the backscattering zone forming a backscattered ambient signal, and/or
at least one reception zone, by the at least one receiver device, of said backscattered ambient signal;
the at least one source comprising means for:
determining an emission constraint that, when the emission constraint is applied by the at least one source to emit the ambient radio signal, the at least one backscattering zone is generated in which a received electromagnetic power is greater than a determined threshold, called backscattering threshold, and/or the at least one reception zone is generated in which the received electromagnetic power is less than a determined threshold, called reception threshold; and
transmitting the ambient radio signal, by said at least one source, with respect to said emission constraint; and
at least one of:
the at least one transmitter device; or
the at least one receiver device.

15. A source comprising:
means for determining an emission constraint;
means for transmitting an ambient radio signal, with respect to said emission constraint, in a frequency band, called a transmission bandwidth, wherein said transmitting under the emission constraint generates:
at least one backscattering zone in which a received electromagnetic power is greater than a determined threshold, called a backscattering threshold, and/or
at least one reception zone in which a received electromagnetic power is less than a determined threshold, called a reception threshold;
wherein the means for determining is configured to:
estimate, assuming channel reciprocity, a propagation channel between the source and at least one terminal a position of which is intended to be included in the backscattering or the reception zone, from at least one pilot sequence transmitted by said at least one terminal in a frequency band, called a working band included in the transmission bandwidth of the source,
calculate, as a function of the propagation channel estimated, a precoder capable of generating in a region of at least one said terminal electromagnetic power greater than the backscattering threshold or less than the reception threshold according to which the position of the terminal is intended to be included in the backscattering or the reception zone,
said emission constraint corresponding to use by the source of the precoder for transmitting the ambient radio signal.

* * * * *